United States Patent [19]

McBurnett

[11] B 4,013,138
[45] Mar. 22, 1977

[54] EMERGENCY STEERING SYSTEM
[75] Inventor: James R. McBurnett, Corinth, Miss.
[73] Assignee: Tyrone Hydraulics, Inc., Corinth, Miss.
[22] Filed: Nov. 22, 1974
[21] Appl. No.: 526,279
[44] Published under the second Trial Voluntary Protest Program on April 13, 1976 as document No. B 526,279.
[52] U.S. Cl. .................................. 180/133; 60/405; 417/315; 417/426
[51] Int. Cl.[2] .......................................... B62D 5/06
[58] Field of Search ................. 180/79.2 R, 79.2 B; 60/405, 404, 425; 417/315, 426, 427, 286

[56] References Cited
UNITED STATES PATENTS

| | | | |
|---|---|---|---|
| 2,370,526 | 2/1945 | Doran | 60/425 |
| 2,528,764 | 11/1950 | Leonard | 417/315 X |
| 3,631,937 | 1/1972 | Joyce | 180/79.2 B |
| 3,696,613 | 10/1972 | Goodale | 60/404 |

Primary Examiner—M. H. Wood, Jr.
Assistant Examiner—John A. Pekar
Attorney, Agent, or Firm—Synnestvedt & Lechner

[57] ABSTRACT

An emergency hydraulic system for a hydraulically powered device such as the power steering mechanism used on large earth-moving vehicles and the like is disclosed. The emergency system includes an auxiliary pump connected to the wheels or some other part of the vehicle so that the pump is operated despite engine failure whenever the vehicle is in motion. An inlet valve for the pump is held in the closed position whenever the vehicle prime mover is in operation so that the pump is deprived of operating fluid when an emergency condition does not exist. If the prime mover stops running so that the main hydraulic system is not operating and the power steering system is deprived of its source of power, the inlet to the emergency pump is opened so that the pump supplies operating fluid to the steering system so long as the vehicle is in motion. Since the pump is deprived of operating fluid when an emergency does not exist very little power is consumed.

9 Claims, 1 Drawing Figure

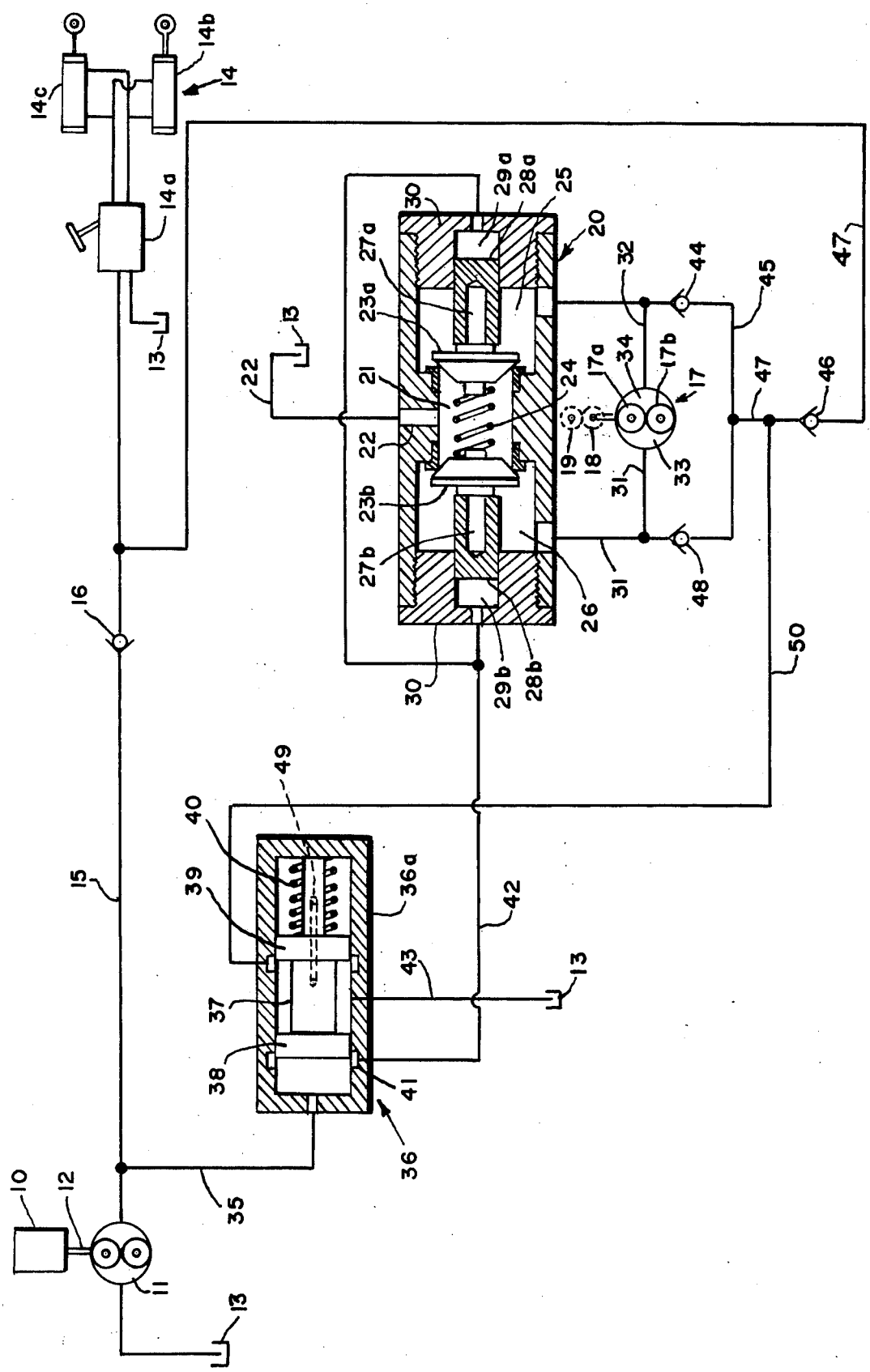

EMERGENCY STEERING SYSTEM

RELATED APPLICATION

This application relates to application Ser. No. 311,791, filed in the names of James R. McBurnett and Frank W. Ratliff on Dec. 4, 1972 now U.S. Pat. NO. 3,849,985.

FIELD OF THE INVENTION

This invention relates to emergency or back-up hydraulic systems used for example in heavy equipment such as earth-moving vehicles, trucks and the like.

BACKGROUND OF THE INVENTION

In the above-identified Ratliff and McBurnett application, a pair of hydraulic motors of the gear type are disclosed which receive operating fluid under pressure from a common source and which are used to operate equipment such as a hoist. Valve means are provided at the inlets of these motors so that under certain conditions of operation, when only one motor is required, the inlet of the other motor is closed so that the gears of that motor operate or turn "starved" and therefore do not consume appreciable prime mover horsepower. In certain of its aspects, the present invention embodies some subject matter disclosed in the prior copending application, in that one of two fixed displacement hydraulic devices of the gear type is provided with inlet valve means which causes this device to be deprived of operating fluid and therefore run dry or starved when not required. In the present invention, this device functions as a vehicle mounted pump which is driven by the vehicle whenever it is in motion. Under certain conditions of operation, as described hereinafter, the pump is deprived of operating fluid so that it operates in a no load condition and does not consume appreciable horsepower of the prime mover.

Various forms of supplemental or emergency hydraulic systems have been provided in the past for operating steering systems, braking systems and the like when there is a failure in the main hydraulic system caused, for example, when the prime mover of a vehicle or other piece of equipment in which the hydraulically operated system is used fails to operate. This invention represents an improvement in such emergency systems and particularly in systems of the kind disclosed in U.S. Pat. No. 3,631,937 issued Jan. 4, 1972 and owned by the Assignee of this application. As indicated in the above-identified patent, in hydraulic power steering systems for vehicles, customary practice is to provide a steering pump driven by the prime mover of the vehicle for supplying operating fluid to a steering valve which operates a steering mechanism in response to movements of a steering wheel or other steering mechanism. If the prime mover acidentally stops while the vehicle is in motion, the primary pump will fail to provide fluid to the steering mechanism. With heavy equipment such a failure can be very dangerous since it is practically impossible to steer the vehicle when the hydraulic system is deprived of operating fluid.

In the system described and claimed in U.S. Pat. No. 3,631,937, a supplemental pump is operated by the vehicle so that the pump is always operated whenever the vehicle is in motion, due to a connection with the vehicle axle or some other part which is always in motion when the vehicle is underway. In this system, the output of this secondary pump is always pumping fluid and thus provides a supplemental source of fluid when the vehicle is in motion. Although this system operates effectively in practice, the pump is always circulating fluid when the vehicle is in motion and therefore consumes an appreciable amount of energy even when the output of the power steering pump is adequate for operation of the power steering system.

The present invention provides a secondary pump which circulates fluid only when actually required, as in a true emergency condition and includes a novel and improved valve system which operates to insure that operating fluid is reliably provided only when it is actually required. At all other times, the pump operates in a no-load state in which it is deprived of operating fluid. Since it is not pumping fluid in that state, it uses very little energy and yet is always available in case of need.

With the foregoing in view, an important object of the invention is the provision of a hydraulic control system for a vehicle driven hydraulic pump, which delivers hydraulic fluid to the pump when the pump is needed.

Another object of the invention is the provision of a hydraulic control system for emergency steering pumps which is reliable and efficient in operation, consuming very little horsepower when the pump is not required.

Still another object of the invention is the provision of a hydraulic control system for a pump which permits operation of the pump only in response to a given condition of operation of a primary hydraulic system.

Still another object of the invention is the provision in a vehicle, of a hydraulic control system for an emergency hydraulic pump which consumes very little energy and operates relatively silently during normal operation of the vehicle.

The above and other objects of the invention are accomplished by an emergency hydraulic system for a steering mechanism or the like which is operated by a primary source of hydraulic operating fluid, the emergency system comprising a pump adapted to be reversibly operated by the vehicle in accordance with its direction of movement and inlet means for the pump comprising a pair of inlet valves connected to pump chambers adapted to be used alternately as suction and discharge chambers depending upon the direction of operation of the pump. The valve means includes devices for preventing the passage of fluid through said inlet means when a primary source of hydraulic fluid is in operation and further includes means communicating with the valve means and responsive to the pressures in said pump chambers for blocking the inlet connected to the pump chamber serving as discharge chamber and for opening the inlet to the chamber serving as suction chamber, so that the pump is supplied with operating fluid at all times when the primary source of fluid is not in operation.

BRIEF DESCRIPTION OF THE DRAWING

The drawing illustrates in schematic form primary and back-up hydraulic control systems for power steering equipment in a wheeled vehicle.

DETAILED DESCRIPTION OF THE PREFERRED EMBODIMENT

Turning now to the detailed description of the preferred embodiment of the invention, reference is made to the accompanying drawing in which the Figure illustrates a gear pump operated hydraulic control system incorporating the principals of the present invention.

The control system in this embodiment is used in a large earth-moving vehicle comprised of a prime mover 10 which supplies motive power to wheels or tracks, not shown, in a manner well understood by those of ordinary skill in this art. Prime mover 10 also drives a power steering pump 11 which is preferably of the gear type, via a power takeoff schematically represented at 12. Power steering pump 11 supplies operating fluid from a reservoir 13 connected to the power steering equipment for the vehicle schematically represented at 14. The power steering equipment 14 includes the usual power steering valve 14a and typically includes hydraulic operating rams 14b and 14c which operate steering linkages of the vehicle. Operating fluid discharged under pressure by the pump 11 flows to the power steering equipment via a conduit 15 in which is located a check valve 16, the purpose of which will appear hereinafter. Fluid from the pump 11 is circulated back to the reservoir 13 in the usual manner.

In carrying out the principles of the present invention, there is provided a second or auxiliary pump schematically represented at 17. Pump 17 is preferably of the gear type, having pumping gears 17a and 17b, and is adapted to be reversibly operated by the vehicle by means of a suitable drive connection schematically represented in broken lines by gears 18 and 19. Gear 19 is driven by the drive shaft or some other part of the vehicle which is directly connected to the wheels so that the pump is operated whenever the vehicle is in motion. The direction of rotation of pump 17 is thus dependent on the direction of operation of the vehicle.

In carrying out the invention, fluid is supplied to the pump 17 from the reservoir 13 by inlet valve means generally indicated by the reference character 20. Fluid from the reservoir 13 enters a central inlet cavity 21 via a passageway 22. The valve means preferably comprises a pair of check members 23a and 23b. A spring 24 urges the check members to positions in which they permit communication between central cavity 21 and outlet passages 25, 26 located on opposite sides of the inlet cavity 21.

The valve members 23a and 23b are each provided with stems 27a and 27b on which are mounted pistons 28a and 28b respectively. The latter are slidably mounted in bores, identified as 29a and 29b, located in plugs 30 threadedly secured in the ends of the valve body.

A first valve outlet passage 26 communicates with pump 17 via a passageway schematically shown at 31. A passageway 32 connects the pump 17 with a second valve outlet passage 25. As indicated, pump 17 is a fixed displacement hydraulic pump preferably of the gear type. The passageways 31 and 32 lead to pump chambers 33 and 34 on opposite sides of the gears 17a and 17b. Chambers 33 and 34 alternatively serve as discharge and suction chambers, receiving fluid through the lines 31 or 32, depending upon the direction of rotation of the gears, as determined by the direction of movement of the vehicle.

Passage of operating fluid through valve means 20 to auxiliary pump 17 is under control of primary pump 11 which is driven only upon operation of the prime mover 10. Preferably, control of the valve means 20 is by pilot means comprising a pilot line 35 which is connected to the discharge side of pump 11 and leads to a pilot valve 36. Pilot valve 36 comprises a valve housing 36a in which a control spool member 37 comprising a pair of spaced apart lands 38 and 39 is slidably mounted. A spring 40 urges the spool member to the left as viewed in the drawing. Pressure admitted to the valve via the line 33 shifts the spool member to the right when a predetermined pressure value, as determined by the spring 40, is exceeded.

Movement of control spool member 37 to the right in response to a predetermined pressure transmitted by line 35 uncovers a port 41. A line 42 leads from port 41 to chambers or bores 29a and 29b in the ends of the body of valve 20. Thus the discharge pressure of pump 11 is communicated to the control valve 20 and acts against the pistons 29a and 29b to hold the valve members 23a and 23b in the closed position whenever the discharge pressure exceeds the pressure exerted on the lands by means of spring 40.

In the event that the pressure in line 35 drops below the predetermined value, as for example when pump 11 stops operating, control spool member 37 shifts to the left as viewed in the drawing, connecting the line 42 to a vent line 43. When this occurs, the pressure holding the valves 23a and 23b on their seats is relieved.

In this condition of operation one of the check valves 23a or 23b will open, depending upon the direction of operation of the pump 17. Assuming that the chamber 33 is serving as the suction chamber of the pump 17, passageway 31 and valve outlet passage 26 will be at a negative pressure and the valve 23b will admit fluid to the pump. At this time, valve member 23a is checked against its seat since discharge pressure is communicated to the back of this valve via the line 32 and outlet passageway 25. When chamber 34 serves as suction chamber, the pressure conditions at the check valves are reversed and fluid is admitted through check valve 23a. Valve 23b is then checked against its seat.

With chamber 34 serving as the discharge chamber, fluid is discharged through line 32, through a check valve 44, a passageway 45, a check valve 46 and another passageway 47 which joins the line 15 downstream from the check valve 16. Fluid is prevented from being short circuited back to the inlet side of pump 17 via a check valve 48 located in a line 49 which joins the lines 31 and 47. In similar manner check valve 16 prevents flow back to the pump 11.

Preferably means are provided in the pilot valve 36 for draining residual fluid discharged by pump 17 when the inlet valve members are in the closed position. This means comprises a drain line 50 which leads from the common discharge intermediate passage 47. Line 50 is vented to the reservoir whenever spool member 37 is moved to the position indicated in the drawing. In this position, direct communication is established through the valve chamber to the line 43 which in turn leads to the reservoir.

As indicated in broken lines, a passageway 49 provides communication between opposite sides of spool 39, so that both sides of the spool are at equal pressures.

In operation, assuming the pump 11 is in operation spool member 37 moves to the right as viewed in the drawing when the pressure on the lefthand face of the spool 38 exceeds the pressure exerted by spring 40. This pressure is communicated to the pistons 27a and 27b via a line 42 to force the valve members 23a and 23b against their seats so that pump 17 is deprived of operating fluid. In this condition, depending upon the direction of rotation of the pump 17, any fluid remaining downstream from the valve members 23a and 23b is discharged through line 31 or line 32 through check valve 44 or 48, line 47 and drain line 50 through te body of valve 36 to the reservoir. Operating fluid pumped by the pump 11 is delivered to the power steering valve 14a and is prevented from flowing to the pump 17 or to the reservoir because of the check valve 46.

If pump 11 stops operating or the discharge pressure drops below the predetermined value, spool member 37 shifts to the left as viewed in the drawing closing off the vent line 50. At the same time spool 38 establishes communication between port 41 and line 43 so that the pressure holding the check members 23a and 23b against their seats drops to reservoir pressure. Depending upon the direction of rotation of the gears in pump 17 one of the chambers 33 or chamber 34 serves as the pump suction chamber, and the other serves as discharge chamber. Since the pressures generated in the pump chambers are communicated to the check members 23a and 23b the check member on the low pressure side of the pump opens to admit operating fluid. The pump receives fluid from the appropriate valve member and discharges fluid under pressure to the power steering circuit via the line 47.

Since pump 17 receives no operating fluid when pump 11 is operation, it uses negligible vehicle horsepower under conditions of normal vehicle operation. Under these conditions the pump generates very little noise or heat as the gears rotate freely in the pump housing. The residual oil remaining in the pump housing has been found to be sufficient for lubrication purposes for prolonged periods of time.

Under conditions of normal operation of pump 11 the inlet check valve members 23a and 23b are kept firmly seated by the pressure connection with the discharge of pump 11. As soon as this pressure drops below a predetermined value, fluid is admitted to the pump 17 and the operator of the vehicle is provided with an emergency or back-up source of operating fluid under pressure so that he can safely steer the vehicle under emergency conditions of engine failure.

Although illustrated for use in a circuit for operating a power steering mechanism, it should be understood that the invention has application as an auxiliary or back-up source of operating fluid for a variety of other kinds of hydraulically operated equipment.

1. An emergency control system for use in a reversibly operable vehicle having a hydraulically operated steering system, including reservoir means for a supply of operating fluid for said steering system and a first pump adapted to be operated by the vehicle prime mover for supplying the steering system with operating fluid when the prime mover is in operation, said emergency control system comprising; a second pump adapted to be reversibly operated according to the direction of operation of the vehicle, first and second chambers at opposite sides of said second pump serving alternately as suction and discharge chambers according to the direction of operation of said second pump, valve means for interconnecting said reservoir with said chambers comprising first and second passageways for supply of fluid from said reservoir means to said first and second chambers respectively, a valve member in each of said passageways, said valve members each being movable between a position in which flow from the reservoir to its chamber is blocked and a position in which flow is permitted, control means responsive to operation of said first pump for holding said valve members in the flow blocking position so that no operating fluid is delivered to the second pump when the first pump is operating; said control means being operative to open the valve member blocking flow to the chamber serving as suction chamber when the first pump is not in operation and the vehicle is in motion whereby operating fluid is delivered by said second pump to said steering system when the first pump is not operating.

2. A system according to claim 1, wherein said control means includes means acting on said first and second valve members and responsive to the discharge pressure of said first pump for holding said first and second valve members in a flow blocking position at high values of discharge pressure and for releasing said first and second valve means to permit passage of fluid when discharge pressure of said first pump drops to a low pressure value.

3. A system according to claim 2, wherein said control means further includes a pressure responsive pilot means including a valve member movable to a first position when the discharge pressure of the first pump is at a low value and to a second position when the discharge pressure of said first pump is at a high value, a pressure device acting on said first and second valve members and a pilot line interconnecting the discharge side of said first pump with the pressure devices, said valve member being operative in the first position to block communication of pressurized fluid to the pressure devices and in the second position to permit communication of pressurized fluid to the pressure devices.

4. A system according to claim 3 further including check valve means for preventing flow of fluid from the chamber serving as discharge chamber to the chamber serving as suction chamber when said second pump is not deprived of operating fluid.

5. An emergency steering apparatus for use in a reversibly operable vehicle having a hydraulically operated control system with a primary source of pressurized hydraulic operating fluid for said steering apparatus, said apparatus comprising; an emergency source of hydraulic operating fluid for the control system including a reservoir of fluid and a pump adapted to be reversibly operated by the vehicle in accordance with the direction of movement of the vehicle, valve means for said pump, said valve means comprising a pair of inlets connected respectively to a pair of pump chambers adapted to serve alternatively as pump suction and discharge chambers depending on the direction of operation of the pump by the Vehicle, movable valve members in said inlets and fluid pressure means responsive to the pressure of said primary source for closing said valve members to prevent passage of fluid through said inlets when the primary source is in operation and means including fluid passageway communicating with said valve means and being responsive to the pressures prevailing in said pump chambers for blocking the inlet connected to the pump chamber serving as the pump discharge chamber and for opening the inlet to the chamber serving as the pump suction chamber, whereby the pump is supplied with operating fluid when the primary source is not in operation.

6. In a vehicle having a hydraulic steering system including a steering valve and hydraulically operable steering mechanism controlled by said valve, and means for supplying fluid under pressure to said mechanism including a reservoir of fluid and a first pump operated by the prime mover of the vehicle for supplying fluid through the steering valve to the hydraulically operable mechanism, an emergency source of power for the steering system comprising a vehicle operated reversible pump connected to be driven by the vehicle independently of the operation of the prime mover according to the direction of movement of the vehicle, said pump having first and second chambers serving as suction and discharge chambers according to the direction of operation of the vehicle and inlet valve means for the pump including a pair of valve members connected to said first and second chambers, means responsive to operation of the first pump and acting on said valve members for blocking flow to said second pump whenever the first pump is in operation, valve means for connecting the chamber of said second pump serving as discharge chamber with said steering valve including check members adapted to prevent fluid flow from the first and second pump when the first pump is operating and to prevent the flow of fluid from the second pump to the first when the first pump is not operating.

7. An emergency source of power according to claim 6 wherein said input valve means comprises a pair of check valves each positioned to admit fluid from the reservoir to the first and second pump chambers and to block fluid in the reverse direction, fluid pressure responsive devices operative to hold said check valves in flow blocking position whereby fluid is not passed to the pump in response to high pressures acting on said pressure responsive devices and to release said check valves whereby flow to said second pump is permitted, and pilot means interconnecting the pressure operated device with the discharge of said first pump whereby the discharge pressure of the first pump is communicated to the pressure responsive devices at high discharge pressures.

8. An emergency source of power according to claim 7 wherein said pilot means comprises a spool member biased to a first position in which the discharge pressure is not communicated to the pump, said spool member being movable in response to high discharge pressures to a second position to establish communication of said discharge pressure with said pressure responsive devices.

9. A source of power according to claim 8, further including portage in said pilot means for establishing communication between the discharge of the second pump and the reservoir when the spool member is moved to the second position, said spool member being adapted in the first position to block said portage.

* * * * *